United States Patent [19]
Veenvliet et al.
[11] Patent Number: 4,807,967
[45] Date of Patent: Feb. 28, 1989

[54] PASSIVE DISPLAY DEVICE

[75] Inventors: Hendrik Veenvliet; Antonius G. H. Verhulst; Antonius H. M. Raaymakers, all of Eindhoven, Netherlands

[73] Assignee: U.S. Philips Corporation, New York, N.Y.

[21] Appl. No.: 1,308

[22] Filed: Jan. 8, 1987

[30] Foreign Application Priority Data

Jan. 9, 1986 [NL] Netherlands ........................ 8600027
Mar. 19, 1986 [NL] Netherlands ........................ 8600697

[51] Int. Cl.⁴ ........................ G02B 26/02; G09G 3/16
[52] U.S. Cl. ..................................... 350/269; 340/763
[58] Field of Search ........................ 350/267, 269, 266; 340/763, 764

[56] References Cited

U.S. PATENT DOCUMENTS 4,420,897 12/1983 Castleberry ........................ 340/763
4,519,676 5/1985 te Velde ............................. 340/763
4,695,837 9/1987 Kalt ..................................... 350/269

*Primary Examiner*—John K. Corbin
*Assistant Examiner*—P. M. Dzierzynski
*Attorney, Agent, or Firm*—Paul R. Miller

[57] ABSTRACT

A passive display device is set forth having two substrates (1, 4) which are provided with fixed electrodes and a movable electrode (10) located between the substrates. The movable electrode lies against the upper substrate (4) in the quiescent state, and is connected to the lower substrate (1) by means of supports (9) of polymeric material. A method of manufacturing such a display device is also set forth.

7 Claims, 2 Drawing Sheets

PASSIVE DISPLAY DEVICE

Figure 1:
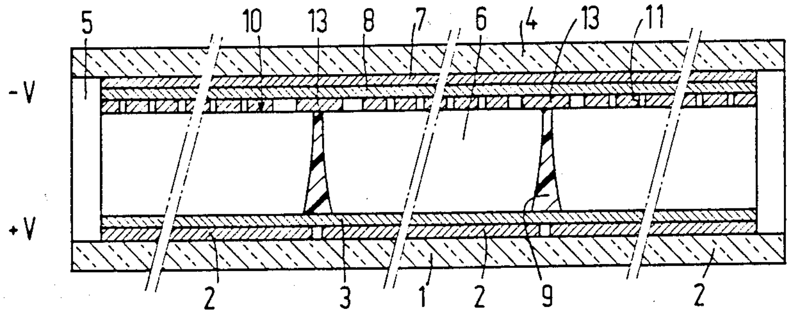

The invention relates to a passive display device comprising a tansparent upper substrate and parallel thereto a second lower substrate which is arranged at some distance, and a number of display elements for controlling the reflection or transmission of light with each element having at least one fixed electrode which is connected to the second substrate and an electrode which is movable between the substrates, which is also connected to the second substrate, and which is provided with apertures and resilient elements.

A passive display device is to be understood to mean herein a display device whose display elements do not generate light themselves but reflect or pass the ambient light in such a manner that a picture is obtained.

An electrostatic passive display device as described above is known from, for example, Applicants' Netherlands Patent Application No. 7510103 which was published on the 1st of March 1977 corresponding to U.S. Pat. No. 4,179,077.

In the known display device, the distance between the second substrate and the movable electrode is very small, for example 0.1–0.3/μm, in the rest position, i.e. the position in which the movable electrode is not subjected to electrostatic forces. Consequently, the movable electrode almost lies against the second substrate. By applying voltage pulses to the electrodes, electrostatic forces are generated which cause the movable electrode to move from the rest position to a second stable position in which the movable electrode lies against the dielectric layer of a fixed transparent electrode which is connected to the upper substrate.

In accordance with this Netherlands Patent Application, the movable electrode is obtained by providing the second (lower) substrate with an electrode which is coated with a layer of a dielectric material. This layer is coated with an approximately 0.2 /μm thick Al layer which is coated with a Ni layer. Resilient elements are provided and holes are etched in the Ni layer in accordance with common etching techniques. In this process a photoresist layer which is applied to the Ni layer is exposed via a mask having the desired pattern. The photoresist layer is subsequently developed and the exposed portions of the Ni layer are etched with an etchant, such as nitric acid, which attacks the Ni layer but does not attack the layer of Al underneath the Ni layer. Subsequently, the etching process is continued using potash lye which attacks the Al layer but not the Ni layer. In a subsequent underetching process and Al layer is substantially removed. The movable Ni electrode is connected to the second substrate via the remaining Al columns whose height is 0.2 /μm.

The known display device as described above has the following disadvantages.

When switching a display element, the movable electrode is moved to the transparent substrate but the so-called bonding plates remain in place. The bonding plates are the parts of the movable electrode which are located between the resilient elements and which are connected to the above-described Al columns. If the display element is filled with a contrasting liquid that is blue, for example, and the movable electrode reflects white, the white image will contain blue dots caused by the presence of the blue liquid over the bonding plates.

A second disadvantages is that the upper transparent substrate which is supported along the edges by a spacer which is provided between the first and the second substrate will be subject to sagging, such that the substrates no longer run parallel, thereby adversely affecting the picture quality. This also causes driving problems.

The above-described known process of manufacturing the movable electrode has the disadvantage that after underetching the Al layer some residual etching material remains. This material is electrically conductive and may give rise to undesired electric contacts between the various display elements. It is also possible that Al residue penetrates the pores of the dielectric layer, such as a $SiO_2$ layer which covers the fixed electrode. This may cause a short-circuit between the movable electrode and the fixed electrode which is connected to the second substrate.

An additional disadvantage is that due to lateral etching the resilient elements of the movable electrode and the apertures of this electrode must be provided in separate processes. This is particularly true when the movable Ni electrode is coated with a Ag layer.

It is an object of the invention to provide a display device and a method of manufacturing such a display device which do not have the above-described disadvantages.

This object is achieved in accordance with the invention by a display device as described in the opening paragraph, which is characterized in that polymeric supports are provided on the second substrate, which extend to a short distance from the transparent substrate, with the movable electrode being supported by and connected to the ends of the supports facing away from the second substrate and lying against, or almost lying against, the transparent substrate.

The display device in accordance with the invention has the advantage that the transparent substrate is supported by supports which are evenly distributed over the surface, and hence the substrate remains entirely flt. A further advantage is that in the non-energized state (quiescent state) the entire movable electrode, i.e. including the bonding plates situated between the resilient elements and connected to and supported by the supports, lies against the transparent substrate. Consequently, in the quiescent state a very uniform picture is obtained.

In an advantageous embodiment the movable electrode is made of Al. In particular when the Al is roughened, a bright white picture is obtained during reflection of light. Moreover, by means of an evaporation or sputtering process Al may easily be provided so as to bond well to the polymer.

In a further advantageous embodiment the movable Al electrode is provided at both major surfaces with a layer of a dielectric material, particularly a layer of $SiO_2$. This increases the brightness of the picture and it is an additional measure to preclude short-circuits.

In a very interesting embodiment of the display device in accordance with the invention, the movable electrode is made of Ag or coated with a layer thereof, and the fixed electrode(s) is (are) provided with a dielectric layer of polyimide.

Thanks to this important embodiment, the accumulation of electric charge in or on the dielectric layers is avoided during operation of the display device. It is to be noted that the accumulation er storage of electric charge on the dielectric layers constitutes a problem with passive display devices. The cause of this accumulation will be explained below. Due to the electric field applied additional ions are formed in the display liquid, either by injection from the movable metal electrodes or by field dissociation and molecules. Under the influence of the electric field applied, these ions are moved to the dielectric layers of the fixed electrodes where they are adsorbed at the surface. The amount of absorbed ions increases in time, also in the case of alternating voltage drive. The accumulation of electric charge on the dielectric layers of the fixed electrodes forms an opposing force during operation of the display (display device), thereby adversely affecting the operation of the display.

In the above-described embodiment of a display device in accordance with the invention, no permanent electric charging takes place. Measurements have shown that the ions formed at the Ag/liquid interface do not adsorb at the polyimide. Driving with a square-wave voltage produces the following effects. When the Ag is positive, small quantities of positive ions are injected into the liquid which are immediately transferred to the polyimide by the electric field. The migration time is short relative to the switching period. After half a period the polarity of the voltage is reversed. Since the ions are not adsorbed at the polyimide, they are rapidly returned to the Ag surface where they are neutralized. In other words, an extraction of ions from the liquid takes place. In the next period this process is repeated, i.e. a slow injection of ions at a positively charged Ag surface, followed by a fast and complete extraction of ions from the liquid at a negatively charged Ag surface.

The supports may be made of any polymeric material or of a plastic or cured (cross-linked) synthetic resin. Preferably, the supports are made of a polyacrylate synthetic resin, a polymethacrylate synthetic resin, polycarbonate synthetic resin or a polyimide synthetic resin.

In each display element of the display device in accordance with the invention, the movable electrode may be moved between two stable positions. In one stable position, also called rest position or non-energized position, the movable electrode lies against the transparent substrate. In the other stable position the movable electrode lies against the fixed electrode which is connected to the second substrate. As a result of this displacement, the transmission or reflection of incident light can be controlled.

The displacement of the movable electrode takes place under the influence of electrostatic forces, possibly, combined with spring forces. The latter forces are generated by the resilient elements which interconnect the movable electrode and the supports. The display device in accordance with the invention may be designed in two ways. In a first embodiment not only the second substrate but also the transparent substrate is provided with a fixed electrode. The electrode of the transparent substrate must be transparent and is made of, for example, ITO (indium-tin oxide). So, the movable electrode moves between the two fixed electrodes solely under the influence of electrostatic forces. The spring forces are negligible.

In the second embodiment, the movable electrode is moved by electrostatic forces from the rest position at the transparent substrate to the second substrate which is provided with a fixed electrode. The spring forces generated in the resilient elements are used to return the movable electrode to the initial position (rest position). The transparent substrate does not have to be provided with a fixed electrode. In both embodiments a short circuit between the movable electrode and the fixed electrode(s) is precluded by the presence of an electrically insulating layer. This layer may be provided on the surface of the fixed electrode(s), on the surface of the movable electrode, or on the surfaces of both. A suitable electrically insulating layer is an $SiO_2$-layer.

The display device is suitable for operation both in the reflection mode and in the transmission mode. When the display device operates in the reflection mode it is filled with a liquid whose colour contrasts with that of the surface of the movable electrode, which surface is turned to the light incident on the display device. Dependent upon which stable position the movable electrode is in, to the observer the picture element concerned will assume either the colour of the surface of the movable electrode or the colour of the contrasting liquid. Thus, a picture can be formed by means of the display elements.

When the display device operates in the transmission mode each display element constitutes a controllable light shutter. The construction is such that, for example, the movable electrode is provided with a pattern of light-transmitting areas and that the fixed electrode on one of the substrates is provided with a pattern of light-transmitting areas which is the negative of the pattern of the movable electrode. No light is passed when both electrodes are located substantially in one plane.

During operation of the display device, for example a display device having a three-electrode system, voltage pulses of +V and −V, respectively, are applied to the fixed electrode, i.e. the fixed upper electrode and the fixed lower electrode, a variable voltage pulse $V_g$ being applied simultaneously to the movable electrode. When the voltage at the movable electrode is about −V, the movable electrode will be rejected by the fixed lower electrode and be attracted by the fixed upper electrode. In this case, the movable electrode will lie against the fixed upper electrode. If a voltage of approximately +V is applied to the movable electrode, this electrode willl move from the fixed upper electrode to the fixed lower electrode.

The invention further relates to a method of manufacturing a passive display device, in which a lower substrate is provided on one side with an electrode which is covered with a layer of a dielectric material to which, in succession, a layer of a polymer, a layer of Al or Ag, a photoresist layer and a mask having apertures are applied with the photoresist layer being exposed and developed via the mask with the layer of Al or Ag being etched with a pattern of apertures being formed in this layer, which pattern corresponds to the pattern of the mask and contains tag-like elements between which there are bonding plates with the polymer being etched by means of a gas plasma via the apertures in the layer of Al or Ag with polymeric supports being formed underneath the bonding plate and with the residual polymeric material being etched away, after which the Al or Ag layer is coated with a transparent substrate.

In comparison with the known method described hereinbefore, the method in accordance with the invention has the advantage that thanks to the use of a polymer and a gas plasma as an etchant no short-circuits are produced in the picture display device between the various parts of the movable electrode and between the fixed and the movable electrode. A further advantage is that the entire movable Al or Ag electrode, i.e. provided with apertures and resilient elements, can be manufactured on one single operation. Other advantageous aspects of the method in accordance with the invention are that the Al or Ag layer bonds well to the polymeric layer, that the polymeric layer is insensitive to the etchant of the Al or Ag layer, and that the gas plasma used for etching the polymer does not have a disastrous effect on, in particular, the Al layer.

In a preferred embodiment of the method in accordance with the invention, the polymeric layer is etched with an oxygen plasma. In this case, Al should preferably be used as an electrode material. Ag is slightly more sensitive to $O_2$-plasma. When Ag is used, it is better to use a $H_2$-plasma for etching the polymeric layer.

In an advantageous embodiment of the method in accordance with the invention, a polymeric layer is used whose surface facing away from the lower substrate has a rough texture.

Thus, it is attained that the layer of Al or Ag which is vapour-deposited or sputtered onto the polymeric layer has such a rough texture at both surfaces, and consequently, that the ultimately obtained movable electrode also has rough surfaces. This has the advantage that the adhesion between a surface of the movable electrode and a fixed electrode is smaller, and consequently, that the electrostatic forces which move the movable electrode from one stable position to another stable position also are smaller.

Preferably, the rough surface of the polymeric layer is obtained by providing the lower substrate carrying the fixed electrode and a dielectric material with a layer of a liquid curable synthetic resin composition, after which the assembly is pressed against a mould whose surface texture is the negative of the desired texture of the polymeric layer, and subsequently, the synthetic resin composition is cured and the mould removed.

A suitable synthetic resin composition is a UV-curable composition of mono-, di-, tri- and/or tetraacrylates.

In a further advantageous embodiment of the method in accordance with the invention, it is achieved that in etching the polymeric layer, not only the parts or supports underneath the bonding plates remain in tact, but also the parts of the polymeric layer situated on the peripheral edge of the lower substrate, thus forming a sealing edge of a polymeric material between the lower substrate and the transparent substrate.

Figure 2:
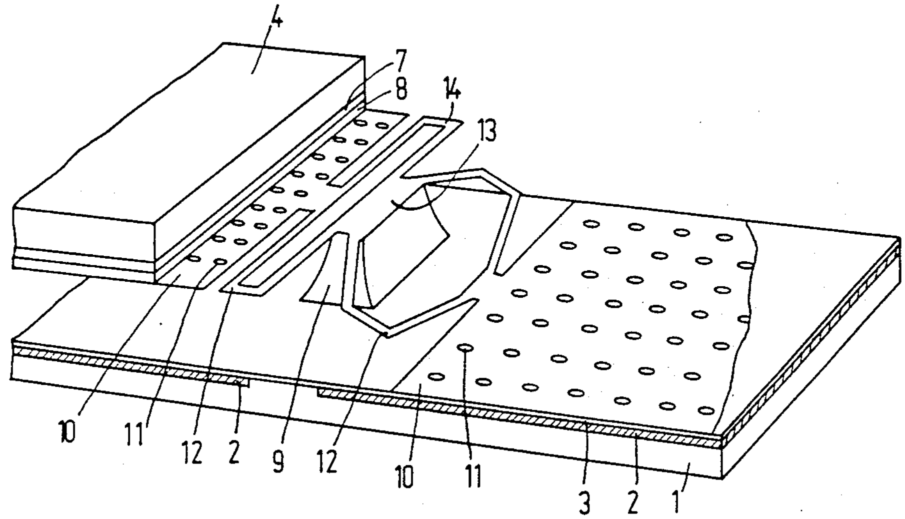

The invention will now be explained in more detail with reference to a drawing, in which FIG. 1 is a cross-sectional view of a display device in accordance with the invention, FIG. 2 is a perspective, partially exploded view of the device in accordance with the invention, and FIG. 3A, 3B, 3C, and 3D are cross-sectional views of the manufacture of the display device.

Reference numeral 1 in FIG. 1 denotes a lower substrate which is made of, for example, glass, ceramic material or synthetic resin. The substrate 1 is provided with a number of strip-shaped fixed electrodes 2 having a thickness of approximately 0.2 /μm. The electrodes 2 are made of, for example, ITO (indium-tin oxide). The electrodes 2 are coated with a dielectric layer 3 which consists of, for example, quartz. The thickness of the dielectric layer is 1–2 /μm. Parallel to the lower substrate 1 extends a transparent substrate 4 which is made of, for example, glass or a transparent synthetic resin. Both substrates 1 and 4 are interconnected at their edges by a so-called spacer 5 which is made of, for example, synthetic resin. Spacer 5 also acts as a sealing element, so that an enclosed space 6 is formed. At the side facing the substrate 1 substrate 4 is provided with a fixed transparent electrode 7 which is made of, for example, indium oxide. Electrode 7 is covered with a quartz dielectric layer 8. The thickness of electrode 7 and layer 8 is identical with the thickness of electrode 2 and dielectric layer 3, respectively.

Supports 9 are located on the dielectric layer 3, which supports consist of a polymer (synthetic resin), such as a polyacrylate synthetic resin which is cross-linked with light or heat. The supports 9 support the movable electrodes 10 which are made of Al or Ag. If the movable electrodes 10 are made of Ag or if they are coated with a layer of Ag, it is to be preferred to use polyimide for the manufacture of the dielectric layers 3 and 8 of the fixed electrodes 2 and 7, respectively. The electrodes 10 are provided with apertures 11 and resilient elements 12 (see FIG. 2, in which like parts are designated by the same reference numerals as in FIG. 1). The connecting member 13 of the movable electrodes 10 which is located between the resilient elements 12 is termed bonding plate. The supports 9 support the electrodes 10 at the location of the bonding plates 13, and their ends are connected to the bonding plates. The movable electrodes 10 are connected through in one direction by means of the resilient elements 12 and the bonding plates 13 and form strip-shaped electrodes which cross the electrodes 2 perpendicularly. If the electrodes 10 are made of Al, it is to be preferred to provide both surfaces of the electrodes 10 with a dielectric layer of, for example $SiO_2$. In the quiescent state, as shown in FIG. 1, the electrodes 10 lie against the dielectric layer 8 of the fixed electrode 7. The space 6 between the substrates 1 and 4 is filled with an opaque, non-conductive liquid whose colour contrasts with the diffusely reflecting colour of the electrodes 10. The liquid consists of, for example, a solution of sudan black in toluene. The electrodes 10 can be set from one stable state to the other by applying voltages to the electrodes 2, 7 and 10. When the electrodes 10 are located against the dielectric layer 8, they reflect the ambient light. When the electrodes 10 are located against the dielectric layer 3, they are, on the observer's side, invisible via the transparent substrate 4 and the ambient light is adsorbed by the liquid or reflected in the colour of the liquid. The device forms a so-called matrix display device in which the strip-shaped electrodes 2 form, for example, the row electrodes and the strip-shaped electrodes 10 form the column electrodes.

For writing the image all electrodes 10 are assumed to be situated on the side of the transparent substrate 4. The row electrodes 2 and the common fixed electrode 7 are kept at a voltage of +V and −V Volt, respectively. The information for a driven row electrode 2 is supplied to all column electrodes simultaneously. Voltage pulses Vg of −V volts are supplied to the column electrodes whose electrode 10 must be switched to the substrate 1 at the intersection with the driven row electrode 2, while to the remaining column electrodes voltage pulses of 0 volts are applied. After writing, all electrodes 10 may be transferred to the transparent supporting plate 4 again by simultaneously energizing all column electrodes to +V volts.

Figure 3A:
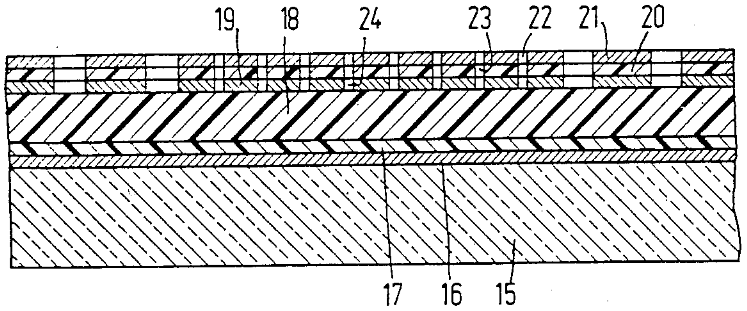

Reference numeral 15 in FIG. 3A denotes a substrate of, for example, glass, which is provided, on one side with an electrode 16, a dielectric layer 17, a layer 18 of an acrylate polymer and a layer 19 of Al. The Al layer is provided with a layer of $SiO_2$ (not shown) on both surfaces. A photoresist layer 20 is applied to layer 19, which is coated with a mask 21 in which apertures 22 are provided. The photoresist layer 20 is exposed via the mask 21 and then developed. Apertures 23 are formed at the location of the exposed places of the resist layer 20. Via the apertures 23 the Al layer 19 is etched, using an alkaline etchant such as an aqueous solution of KOH. In this process, apertures 24 are formed in the layer 19. The mask 21 and the residue of the photoresists layer 20 have meanwhile been removed.

Figure 3B:
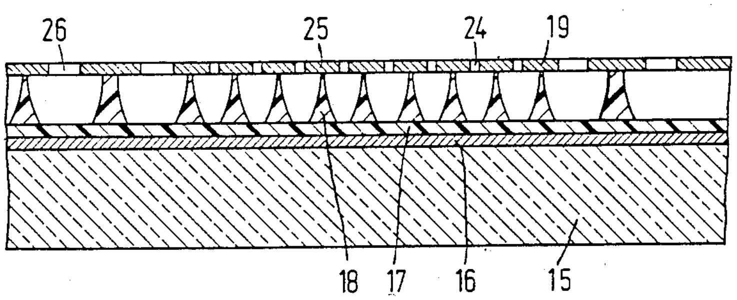

Subsequently, the polymeric layer 18 is treated with an $O_2$ plasma via the apertures 24 in the layer 19. The $O_2$ plasma does not attack the Al layer 19 but etches away the parts of the polymeric layer 18 which are situated below the apertures 24. This intermediate situation is shown in FIG. 3B. The parts indicated by reference numeral 25 are always removed from the polymeric layer 18.

Figure 3C:
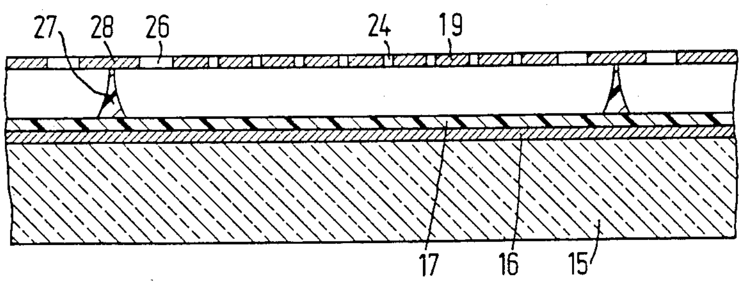

It should be noted that the apertures 24 in layer 19 are circular. Reference is made to the apertures 11 indicated in FIG. 2. The apertures 26 in the layer 19 are slit-shaped. Reference is made to the slits 14 in FIG. 2. Upon further etching of the polymeric layer 18 with the $O_2$ plasma, the situation as shown in FIG. 3C is obtained. Of the polymeric layer 18 only the supports 27 remain. The parts 28 of the layer 19 which are located over the supports 27 are termed bonding plates. Reference is made to reference numeral 13 in FIGS. 1 and 2.

Figure 3D:
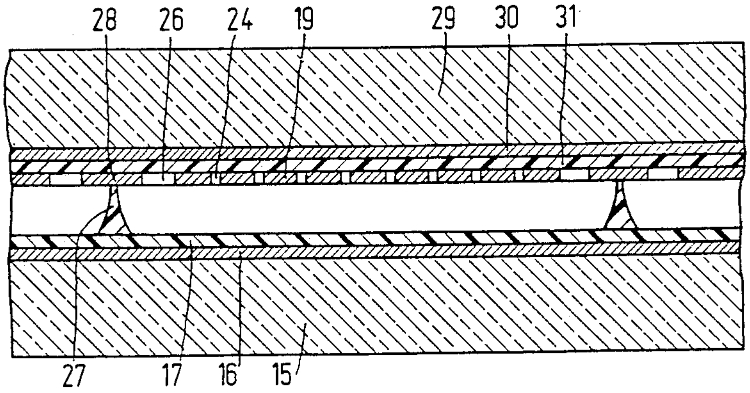

Finally, a transparent substrate 29 as shown in FIG. 3D is positioned over the movable electrode formed (19, 24, 26, 28), which substrate is provided on the side of the movable electrode with a fixed electrode 30 which is coated with a dielectric layer 31.

What is claimed is:

1. A passive display device comprising
first and second separated substrates with at least said first substrate being transparent;
a plurality of display elements disposed between said first and second substrates for controlling reflection or transmission of light,
wherein each of said plurality of display elements include at least one fixed electrode connected to at least said second of said substrates, a movable electrode being movable between said substrates, said movable electrode having a plurality of apertures, and resilient elements connecting said movable electrode to said second of said substrates; and
polymeric supports disposed with one end on said second of said substrates, said resilient elements being supported at a second end of said polymeric supports, said second end of said polymeric supports extending nearly to said first substrate, wherein said polymeric supports are one of polyacrylate synthetic resin, polymethacrylate synthetic resin, polycarbonate synthetic resin, or a polyimide synthetic resin, and
wherein said resilient supports enable said movable electrode of each of said plurality of display elements to be near one of said first substrate or said second substrate.

2. A passive display device according to claim 1 wherein said movable electrode is a structure including aluminum.

3. A passive display device according to claim 2, wherein said movable electrode includes a dielectric layer at a major surface on opposite sides of said movable electrode.

4. A passive display device according to claim 3, wherein said dielectric layer is $SiO_2$.

5. A passive display device according to claim 1, wherein said movable electrode is a structure including Ag, and wherein a polyimide dielectric layer is disposed on said at least one fixed electrode.

6. A passive display device according to claim 5, wherein said structure is Ag.

7. A passive display device according to claim 5, wherein a layer of Ag is disposed on said structure.

* * * * *